US012377513B2

(12) United States Patent
Chen

(10) Patent No.: US 12,377,513 B2
(45) Date of Patent: Aug. 5, 2025

(54) ELECTRIC TOOL GRINDING MACHINE AND CASING THEREOF

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Taoyuan (TW)

( * ) Notice: Subject to any disclaimer, the term of this patent is extended or adjusted under 35 U.S.C. 154(b) by 341 days.

(21) Appl. No.: 17/984,709

(22) Filed: Nov. 10, 2022

(65) Prior Publication Data

US 2024/0157509 A1 May 16, 2024

(51) Int. Cl.
| B24B 23/02 | (2006.01) |
| B24B 47/12 | (2006.01) |
| B24B 47/26 | (2006.01) |
| H02K 5/04 | (2006.01) |
| H02K 7/14 | (2006.01) |
| H02K 9/06 | (2006.01) |
| H02K 9/16 | (2006.01) |

(52) U.S. Cl.
CPC ............ *B24B 23/028* (2013.01); *B24B 23/02* (2013.01); *B24B 47/12* (2013.01); *B24B 47/26* (2013.01); *H02K 5/04* (2013.01); *H02K 7/145* (2013.01); *H02K 9/06* (2013.01); *H02K 9/16* (2013.01)

(58) Field of Classification Search
CPC .. H02K 9/02; H02K 9/04; H02K 9/06; H02K 9/14; H02K 9/16; H02K 5/04; H02K 7/145; B24B 23/02; B24B 5/008; B24B 23/028
See application file for complete search history.

(56) References Cited

U.S. PATENT DOCUMENTS

| 2,862,120 | A | * | 11/1958 | Onsrud | ................. | H02K 5/203 |
| | | | | | | 165/47 |
| 6,900,561 | B2 | * | 5/2005 | Vlemmings | ........... | H02K 5/203 |
| | | | | | | 310/58 |
| 2005/0153636 | A1 | * | 7/2005 | Numata | ................. | B25F 5/008 |
| | | | | | | 451/358 |

FOREIGN PATENT DOCUMENTS

| EP | 2132000 B1 | 4/2012 |
| EP | 2946710 B1 | 8/2017 |
| JP | 5454777 B2 * | 3/2014 |

* cited by examiner

*Primary Examiner* — Carlos A. Rivera
(74) *Attorney, Agent, or Firm* — Muncy, Geissler, Olds & Lowe, P.C.

(57) ABSTRACT

An electric tool grinding machine includes an electric motor, an airflow generating member, and a casing. The casing includes a hollow shell, a motor housing located in the hollow shell, two partitioning plates located between a side wall of the motor housing and the hollow shell, at least one air outlet facing the airflow generating member, a first air inlet formed on the hollow shell, and at least one second air inlet formed on the hollow shell and spaced apart from the first air inlet. When the airflow generating member is activated, the first air inlet generates a pressure difference in the hollow shell near an air inlet portion of the motor housing to cause air to be drawn into the second air inlet.

15 Claims, 12 Drawing Sheets

ELECTRIC TOOL GRINDING MACHINE AND CASING THEREOF

FIELD OF THE INVENTION

The invention relates to an electric tool grinding machine, and more particularly to an electric tool grinding machine with a casing with a large air intake volume.

BACKGROUND OF THE INVENTION

An existing electric tool grinding machine is generally attached with an airflow generating member to an eccentric block to which the tool grinding machine belongs, so as to generate an airflow to dissipate heat in the electric tool grinding machine through the airflow generating member, and discharge waste heat generated by an electric motor or a circuit board during operation. One such embodiment is as provided in European Patent No. EP2132000B1, or as shown in FIG. 1. In the technical solution disclosed in FIG. 1, a grinding disc cover 61 of an electric tool grinding machine 60 is provided with a vent holes 611 arranged at intervals in a lateral direction, an airflow generating member 62 is disposed close to the vent holes 611, and at the same time close to a port of the grinding disc cover 61 connected to a tool grinding machine shell 63. Ideally, when the airflow generating member 62 rotates, the airflow generating member 62 introduces air through the vent holes 611 for heat dissipation. However, because of the following reasons: the vent holes 611 are spaced apart from one another (as shown in FIG. 2), and the airflow generating member 62 is too close to the vent holes 611, the vent holes 611 cannot produce the expected effect in practice. When one of the vent holes 611 intakes air, an adjacent one of the vent holes 611 discharges air, resulting in a short flow problem (also known as short cycle). As a result, air intake of the vent holes 611 is not as efficient as expected, and the short flow problem further causes the heat dissipation effect of the airflow generating member 62 to be limited on the eccentric block. Although waste heat can be exhausted as the eccentric block is connected to an electric motor 64, a diameter of a shaft of the eccentric block connecting with the electric motor 64 is generally small, and the waste heat transfer speed is not as fast as the speed of heat generated by the electric motor 64 itself, resulting in continuous accumulation of waste heat, which affects the user's feeling when holding the tool grinding machine shell 63.

Furthermore, the conventional tool grinding machine shell 63 is implemented with a plurality of air inlet holes 631, it is expected to suck in external air through the air inlet holes 631 by air pressure difference generated in the tool grinding machine shell 63 when the airflow generating member 62 rotates to generate airflow. Based on the aforementioned structures, it can be known that the airflow generating member 62 has the problem of poor air intake efficiency and cannot generate suction that meets the requirements, which will affect the air volume entering from the air inlet holes 631, and cannot effectively dissipate heat from the electric motor 64, and therefore the problem of waste heat accumulation of the electric motor 64 is still serious. Furthermore, in order to enable the airflow flowing in the tool grinding machine shell 63 to pass by the electric motor 64, positions of the air inlet holes 631 on the tool grinding machine shell 63 are not directly close to the airflow generating member 62. That is to say, there is a certain distance between the air inlet holes 631 and the airflow generating member 62, and the suction force is also attenuated due to the distance. As a result, the airflow generating member 62 alone is incapable of effectively generating an airflow of high flowing volume in the tool grinding machine shell 63.

Currently, the only solution that can solve the problem of heat accumulation in an electric tool grinding machine is to implement an active dust suction structure 71 on an electric tool grinding machine 70, as shown in FIG. 3 or European Patent No. EP2946710B1. As shown in FIG. 3, an air inlet of the active dust suction structure 71 is a suction port 721 formed on a grinding disc cover 72. During implementation, the active dust suction structure 71 generates suction in a space in the grinding disc cover 72, the aforementioned suction is obviously greater than the suction generated by an airflow generating member 73, and also a large amount of air sucked in through a plurality of air inlets 741 on a grip body 74 contributes greatly to heat dissipation of an electric motor 75.

However, not all electric tool grinding machines can be equipped with the active dust suction structure, and therefore there is still a need for a solution to solve heat accumulation of the electric motor when the electric tool grinding machine is not equipped with the active dust suction structure.

SUMMARY OF THE INVENTION

A main object of the invention is to solve the problem of a casing of the conventional electric tool grinding machine that affects the airflow.

A secondary object of the invention is to solve the problem that heat accumulated in an electric motor of the conventional electric tool grinding machine cannot be easily discharged.

In order to achieve the above objects, the invention provides an electric tool grinding machine including an electric motor, an airflow generating member, and a casing. The airflow generating member rotates when the electric motor is activated. The casing includes a hollow shell, a motor housing located in the hollow shell and provided for disposing the electric motor, two partitioning plates located between a side wall of the motor housing and the hollow shell, at least one air outlet facing the airflow generating member, at least one first air inlet formed on the hollow shell, and at least one second air inlet formed on the hollow shell and spaced apart from the first air inlet. The two partitioning plates define a connecting line therebetween, and the connecting line divides the motor housing into an air inlet portion and an air outlet portion communicating with the air inlet portion, the at least one air outlet is close to the air outlet portion. The at least one first air inlet faces the air inlet portion of the motor housing. When the airflow generating member is activated, a pressure difference is generated by the intake air of the at least one first air inlet at the hollow shell which is near the air inlet portion of the motor housing, and air is drawn into the second air inlet.

In one embodiment, the motor housing includes a top surface connected to the side wall, the two partitioning plates are connected to the side wall, and an airflow passes through the top surface.

In one embodiment, inside the hollow shell is provided with two auxiliary partitioning plates which cooperate with the two partitioning plates.

In one embodiment, the electric tool grinding machine includes a circuit board provided in the casing and electrically connected to the electric motor, the casing has a hold portion provided with the electric motor, and a grip portion provided with the circuit board and extending from the hold portion, and wherein the at least one first air inlet is located on the hold portion, and the at least one second air inlet is located on the grip portion and faces the circuit board.

In one embodiment, the hold portion includes a head section and a neck section extending from the head section and close to the airflow generating member, and the at least one first air inlet is close to a position where the neck section is connected to the grip portion.

In one embodiment, an air inlet position of the at least one second air inlet is lower than an air inlet position of the at least one first air inlet.

In one embodiment, the casing is composed of a plurality of shells, and one of the plurality of shells forms the motor housing, the two partitioning plates, the at least one air outlet, the at least one first air inlet and the at least one second air inlet.

In one embodiment, the at least one air outlet is disposed along an edge of the motor housing.

In addition to the above, the invention further provides a casing of an electric tool grinding machine including a hollow shell, a motor housing, two partitioning plates, at least one air outlet, at least one first air inlet, and at least one second air inlet. The motor housing is located in the hollow shell. The two partitioning plates are located between a side wall of the motor housing and the hollow shell. The two partitioning plates located on two opposite sides of the motor housing. The at least one air outlet is formed on the hollow shell or an outer edge of the motor housing. The at least one first air inlet is formed on the hollow shell. The at least one first air inlet and the at least one air outlet are respectively located on two sides of one of the two partitioning plates. The at least one first air inlet faces the motor housing and is close to one of the two partitioning plates. The at least one second air inlet is formed on the hollow shell and is located on one side of one of the two partitioning plates where the first air inlet is located. A distance between the second air inlet and the air outlet is greater than a distance between the first air inlet and the air outlet.

In one embodiment, inside the hollow shell is provided with two auxiliary partitioning plates which cooperate with the two partitioning plates.

In one embodiment, the hollow shell is divided into a hold portion and a grip portion extending from the hold portion, the first air inlet is located at the hold portion, and the second air inlet is located at the grip portion.

In one embodiment, the hold portion includes a head section and a neck section extending from the head section, and the at least one first air inlet is close to a position where the neck section is connected to the grip portion.

In one embodiment, an air inlet position of the at least one second air inlet is lower than an air inlet position of the at least one first air inlet.

In one embodiment, a plurality of shells collectively form the hollow shell, and one of the plurality of shells forms part of the hollow shell, the motor housing, the two partitioning plates, the at least one air outlet, the at least one first air inlet and the at least one second air inlet.

In one embodiment, the air outlet is disposed along an edge of the motor housing.

Through the aforementioned implementation of the invention, compared with the conventional technique, the invention has the following features: the at least one first air inlet of the invention is acted on by the airflow generating member before the at least one second air inlet, and the at least one first air inlet generates a pressure difference in the hollow shell near the air inlet portion of the motor housing to cause air to be drawn into the at least one second air inlet, which specifically improves the problem that the airflow in the casing is generated only by suction of the airflow generating member and improves the problem that the airflow is insufficient to cope with heat dissipation inside the casing. According to the invention, both the at least one first air inlet and the at least one second air inlet are for air intake, so that a large airflow can be generated inside the casing, and therefore heat exchange with the motor housing is increased, and waste heat accumulated in the motor housing caused by operation of the electric motor is effectively dissipated. In addition, in the invention, through the two partitioning plates, the airflow completely passes through the top surface of the motor housing, so that temperature rise of the part of the hollow shell provided for a user to hold is no longer severe, which greatly increases the comfort of the user's palm when holding and using the electric tool grinding machine over a long period of time.

DETAILED DESCRIPTION OF THE PREFERRED EMBODIMENTS

Figure 1:
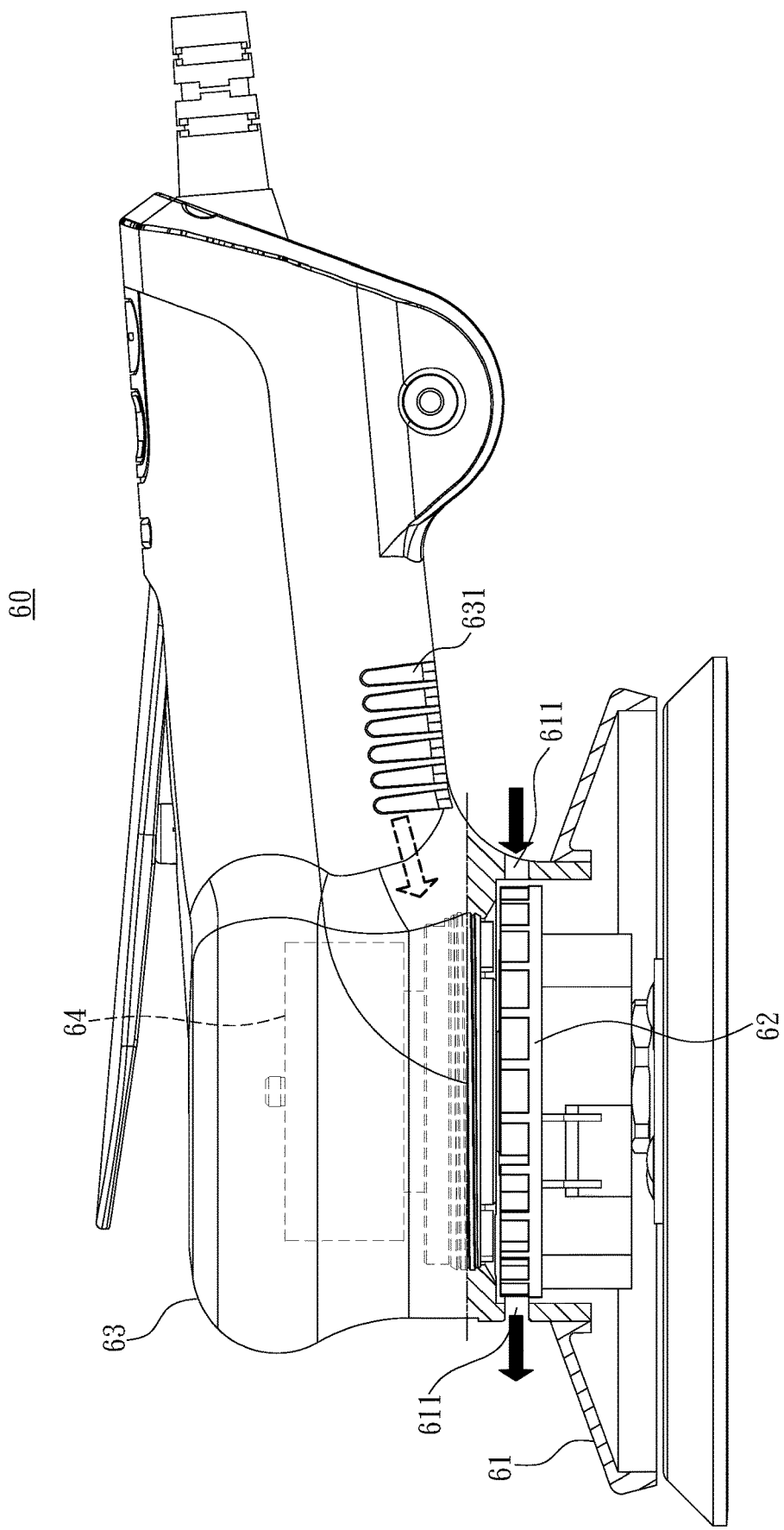
FIG. 1 is a schematic diagram of implementation of a first embodiment of a conventional electric tool grinding machine.
Figure 2:
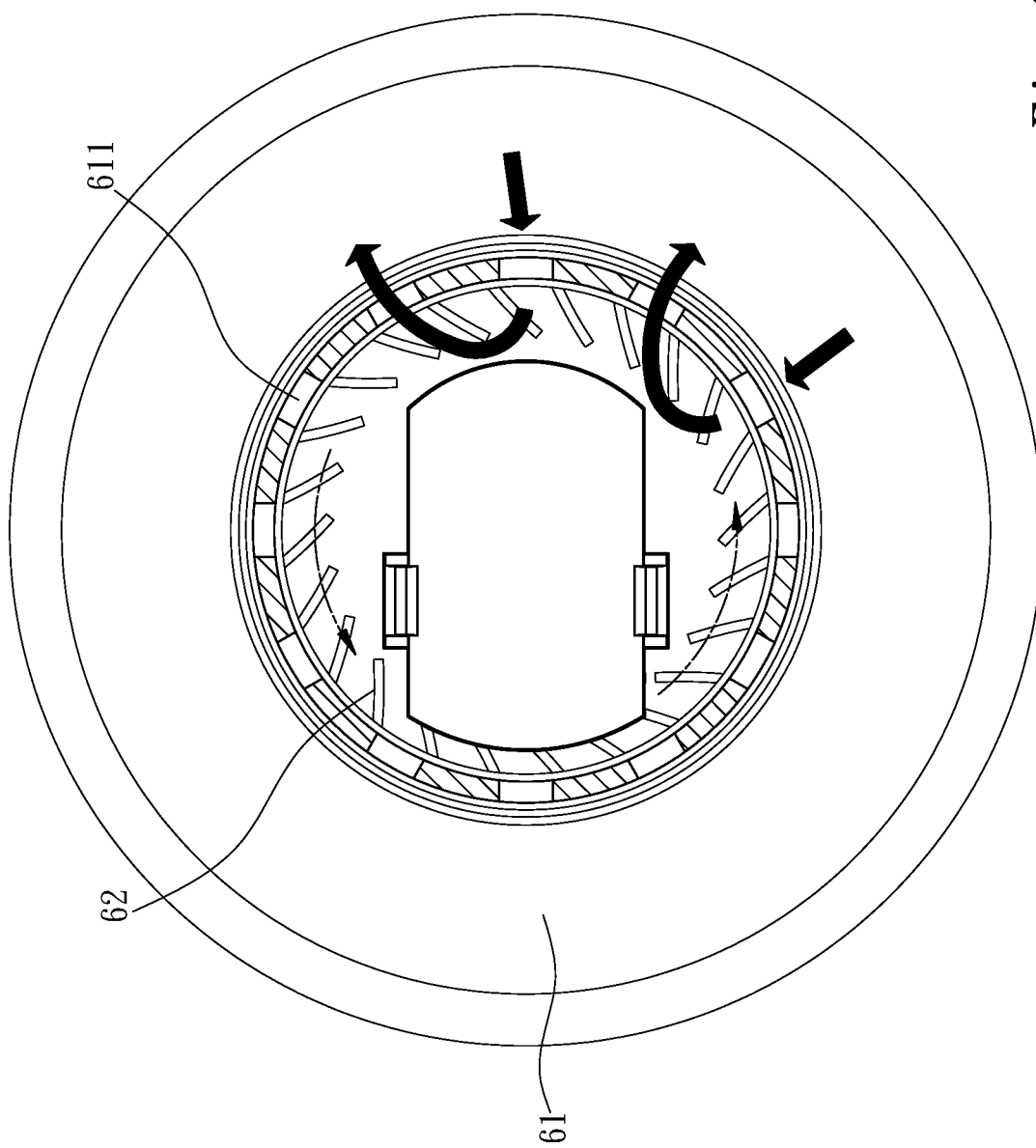
FIG. 2 is a schematic diagram of airflow of the first embodiment of the conventional electric tool grinding machine.
Figure 3:
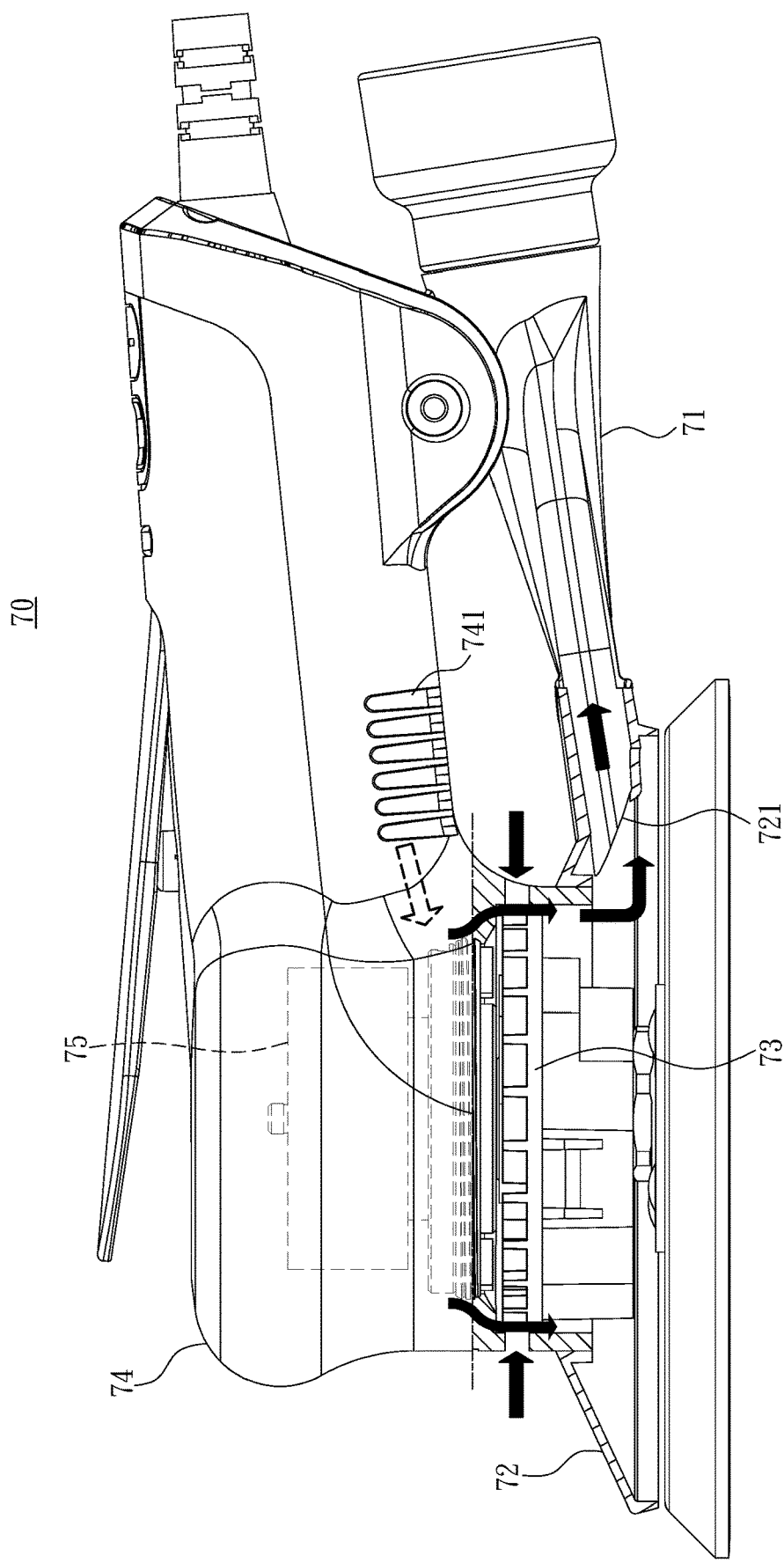
FIG. 3 is a schematic diagram of implementation of a second embodiment of the conventional electric tool grinding machine.

The detailed description and technical content of the invention are described below with reference to the accompanying drawings.

Please refer to FIG. 4, FIG. 5, FIG. 6, and FIG. 7, the invention provides an electric tool grinding machine 20, which comprises a casing 21, an electric motor 23, an airflow generating member 24, and a grinding disc 25. The casing 21 comprises a hollow shell 211, a motor housing 212 provided for disposing the electric motor 23, two partitioning plates 213, at least one air outlet 214, at least one first air inlet 215, and at least one second air inlet 216. In one embodiment, the hollow shell 211 is assembled by a plurality of shells 217. The motor housing 212 is located in the hollow shell 211, and the motor housing 212 is directly formed by one of the plurality of shells 217. In the invention, the motor housing 212 is not attached to an inner wall of the hollow shell 211, so that the casing 21 forms a ventilation gap 218 located between the hollow shell 211 and the motor housing 212. In addition, the two partitioning plates 213 are located between a side wall 219 of the motor housing 212 and the hollow shell 211. More specifically, the two partitioning plates 213 are located on two opposite sides of the motor housing 212, and the two partitioning plates 213 are located in the ventilation gap 218. It should be understood that the two partitioning plates 213 do not completely separate the ventilation gap 218 into two areas, and the two partitioning plates 213 guide an airflow to flow toward parts that is not blocked by the two partitioning plates 213. Further, the motor housing 212 comprises the side wall 219 and a top surface 220 connected to the side wall 219. The two partitioning plates 213 are connected to the side wall 219 and guide an airflow to pass through the top surface 220. In addition, the two partitioning plates 213 define a connecting line therebetween, and the connecting line divides the motor housing 212 into an air inlet portion 221 and an air outlet portion 222, and the air inlet portion 221 communicates with the air outlet portion 222.

Figure 6:
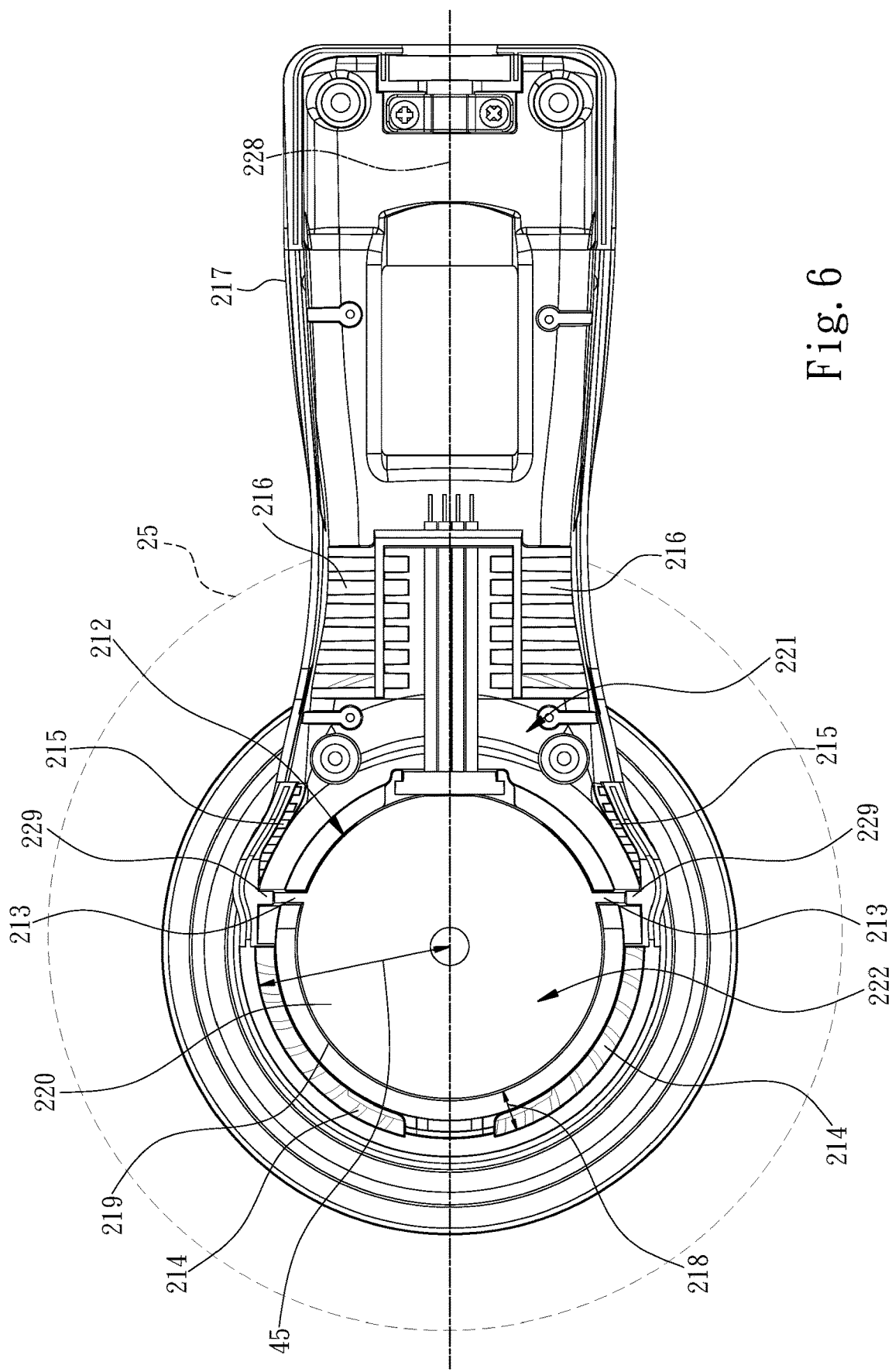
FIG. 6 is a top view of partial structures of an embodiment of the electric tool grinding machine of the invention.
Figure 7:
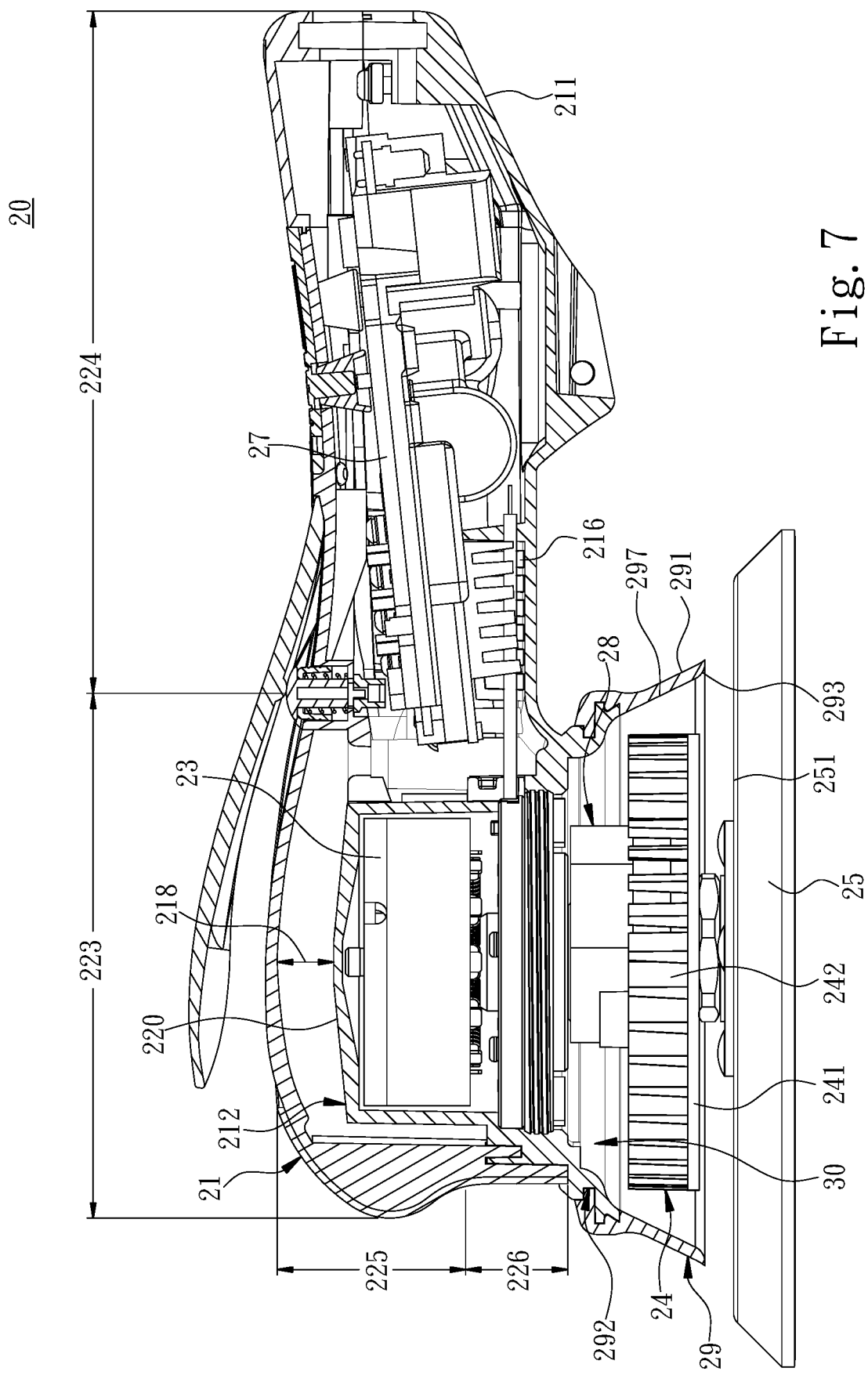
FIG. 7 is a cross-sectional structural view of an embodiment of the electric tool grinding machine of the invention.

Please refer to FIG. 6 and FIG. 7, the at least one air outlet 214 of the invention faces the airflow generating member 24, and the at least one air outlet 214 is formed on the hollow shell 211 or an outer edge of the motor housing 212. The at least one air outlet 214 is disposed close to the air outlet portion 222 of the motor housing 212, and the at least one first air inlet 215 corresponds to the air inlet portion 221 of the motor housing 212. That is to say, the at least one air outlet 214 and the at least one first air inlet 215 are located on two sides of the two partitioning plates 213 respectively. In addition, the at least one air outlet 214 is an outlet of an airflow in the casing 21, and the airflow generating member 24 sucks air in the hollow shell 211 from the at least one air outlet 214, and air flows in the casing 21 and generates an airflow. In one embodiment, the at least one air outlet 214 is disposed along an edge of the motor housing 212.

Figure 5:
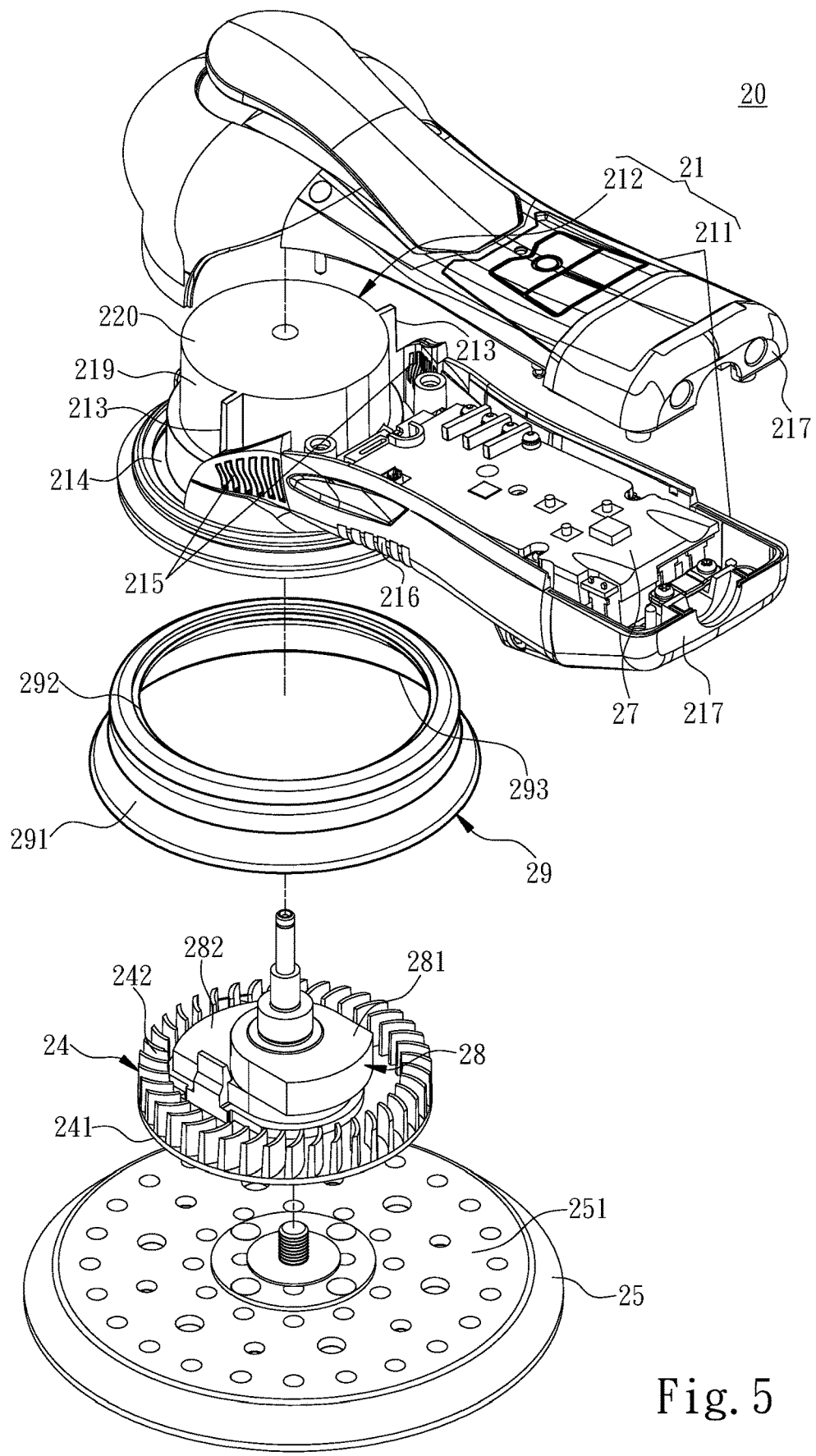
FIG. 5 is a perspective exploded view of structures of an embodiment of the electric tool grinding machine of the invention.
Figure 8:
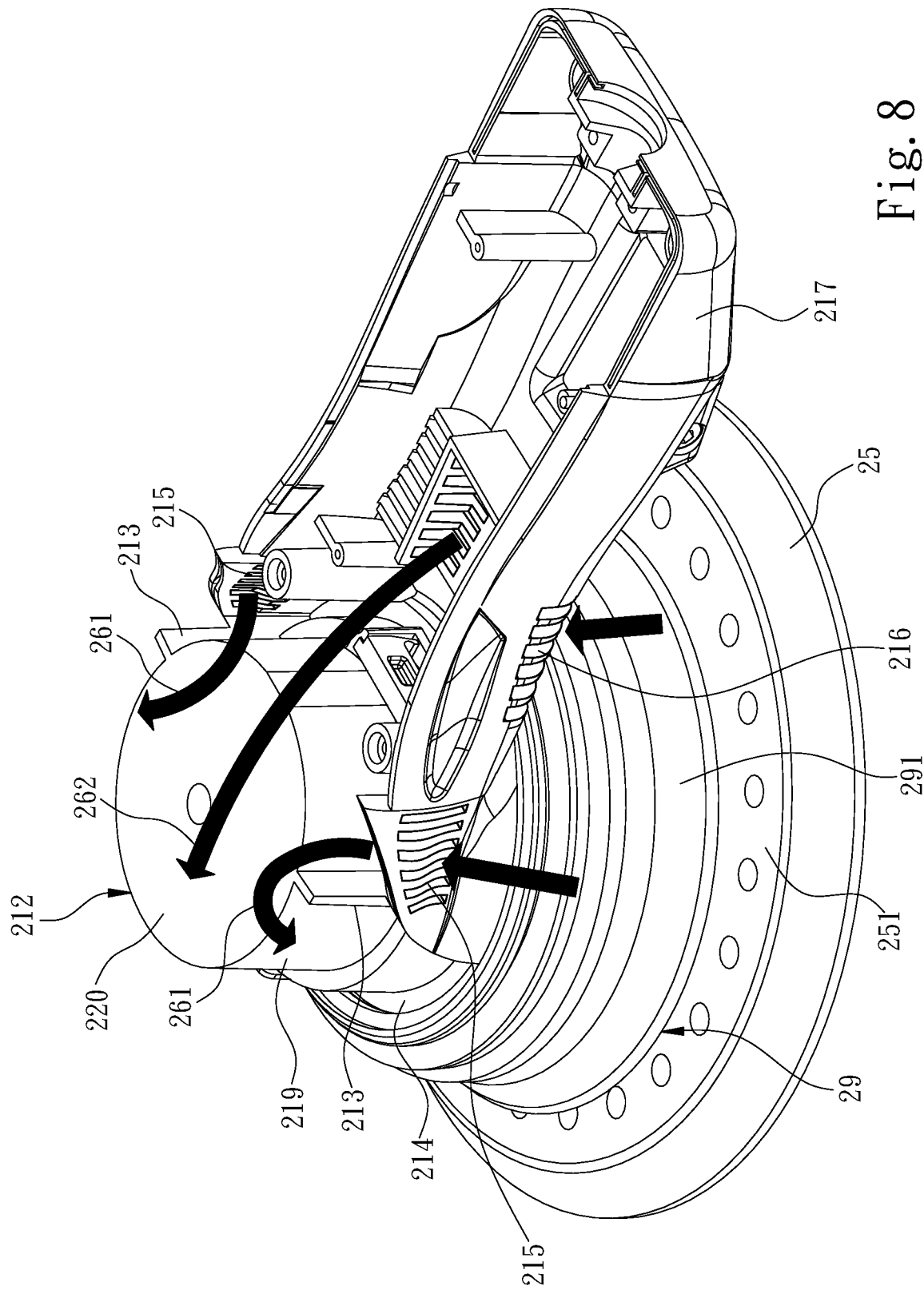
FIG. 8 is a perspective view of air intake of airflow of an embodiment of the electric tool grinding machine of the invention.

Please refer to FIG. 5 and FIG. 6, the at least one first air inlet 215 is formed on the hollow shell 211 and faces the motor housing 212. The at least one first air inlet 215 is close to one of the two partitioning plates 213. In addition, the at least one second air inlet 216 and the at least one first air inlet 215 are located on a same side of the two partitioning plates 213. The at least one second air inlet 216 and the at least one first air inlet 215 are formed on the hollow shell 211 at intervals. A distance from the at least one second air inlet 216 to the at least one air outlet 214 is greater than a distance from the at least one first air inlet 215 to the at least one air outlet 214. Please refer to FIG. 6, FIG. 8 and FIG. 9, when the invention is implemented, because the at least one first air inlet 215 is closer to the at least one air outlet 214 than the at least one second air inlet 216, the at least one first air inlet 215 is influenced by the airflow generating member 24 before the at least one second air inlet 216. It can be said that the at least one first air inlet 215 generates an intake air first (as indicated by 261 in FIG. 8), and a pressure difference is generated by the intake air of the at least one first air inlet 215 at the hollow shell 211 which is near the air inlet portion 221 of the motor housing 212, and the pressure difference influences the at least one second air inlet 216 to draw the air thereinto (as indicated by 262 in FIG. 8). Accordingly, the problem in the conventional technique that an airflow in the casing is generated only by suction of the airflow generating member, and the problem that the airflow is insufficient to cope with heat dissipation inside the casing are significantly improved. Please refer to FIG. 7, FIG. 8, and FIG. 9, both the at least one first air inlet 215 and the at least one second air inlet 216 are for air intake, so that a large airflow is generated inside the casing 21, and therefore heat exchange with the motor housing 212 is increased, and waste heat accumulated in the motor housing 212 caused by operation of the electric motor 23 is effectively dissipated. In addition, in the invention, through the two partitioning plates 213, the airflow completely passes through the top surface 220 of the motor housing 212, so that waste heat on the motor housing 212 is effectively discharged, which greatly increases the comfort of a user's palm when holding and using the electric tool grinding machine 20 over a long period of time.

Please refer to Table 1 and Table 2. Table 1 is a comparison table of temperature rise between the invention and the conventional technique. Specifically, "the invention" refers to the electric tool grinding machine 20 of the invention, "convention without suction" refers to a conventional electric tool grinding machine not equipped with an active dust suction structure and equipped with a grinding disc cover with vent holes, and "convention with suction" refers to a conventional electric tool grinding machine equipped with an active dust suction structure. A temperature measurement point of Table 1 (as indicated by 40 in FIG. 4) is the palm position when the user is grasping the electric tool grinding machine with 80 grit abrasive paper (#80) and 6 inches overall diameter grinding disc at a load of 180 watts (W). Basic conditions of Table 2 are the same as those of Table 1, the only difference is that the temperature measurement point of Table 2 is the user's finger grip position (as indicated by 41 in FIG. 4).

TABLE 1

| | Ambient temperature | Machine running time | | | | |
| --- | --- | --- | --- | --- | --- | --- |
| | | 10 minutes | 15 minutes | 20 minutes | 25 minutes | 30 minutes |
| The invention | 22.3 | 28.8 | 30.9 | 31.7 | 31.8 | 31.7 |
| Convention without suction | 22.8 | 37.4 | 43.3 | 48.1 | 51.9 | 53.1 |
| Convention with suction | 21.8 | 31.9 | 31.4 | 32.3 | 31.0 | 32.0 |

TABLE 2

| | Ambient temperature | Machine running time | | | | |
| --- | --- | --- | --- | --- | --- | --- |
| | | 10 minutes | 15 minutes | 20 minutes | 25 minutes | 30 minutes |
| The invention | 22.3 | 24.8 | 25.2 | 24.9 | 24.4 | 24.3 |
| Convention without suction | 22.8 | 45.1 | 51.8 | 54.7 | 62.3 | 61.1 |
| Convention with suction | 21.8 | 27.9 | 28.9 | 28.1 | 29.2 | 28.9 |

As indicated in Table 1 and Table 2, it can be understood unambiguously that when the conventional technique without dust suction continues to operate for 15 minutes, the temperatures of the palm measurement point and the finger grip measurement point increase significantly. With the high temperatures at the palm measurement point and the finger grip measurement point located on a surface of the electric tool grinding machine, it is obvious that a temperature caused by waste heat accumulation of electric motor inside electric tool grinding machine will be higher, which highlights the problem of waste heat accumulation caused by the airflow formed in the casing of the existing electric tool grinding machine being insufficient to dissipate heat from the components in the casing as described in the conventional technique previously. In contrast, the electric tool grinding machine 20 of the invention does not have a severe temperature rise in multiple detection times. It is obvious that the structure of the at least one first air inlet 215 and the at least one second air inlet 216 of the invention is reliably capable of achieving an object of coordinating air intake to increase an airflow volume in the casing 21 and quickly dissipate waste heat generated by operation of the electric motor 23. Temperature changes at the palm measurement point highlight that the two partitioning plates 213 of the invention enable the airflow to pass through the top surface 220 of the motor housing 212 completely, so that temperature rise of the part of the hollow shell 211 provided for the user to hold is no longer severe, which greatly increases the comfort of the user's palm when holding and using the electric tool grinding machine 20 over a long period of time.

Comparing the temperatures of the invention and the conventional technique with dust suction during the different operation times of the electric tool grinding machine, in addition to the temperatures of the palm measurement point of the invention without the active dust suction structure being on par with the temperatures of the conventional technique with dust suction, performance of the invention without the active dust suction structure produced at the finger grip measurement point (Table 2) is significantly better than that of the conventional technique with dust suction. Accordingly, the invention is capable of practically improving the problem of heat accumulation of the electric motor 23 that the conventional technique structure is incapable of solving.

Figure 4:
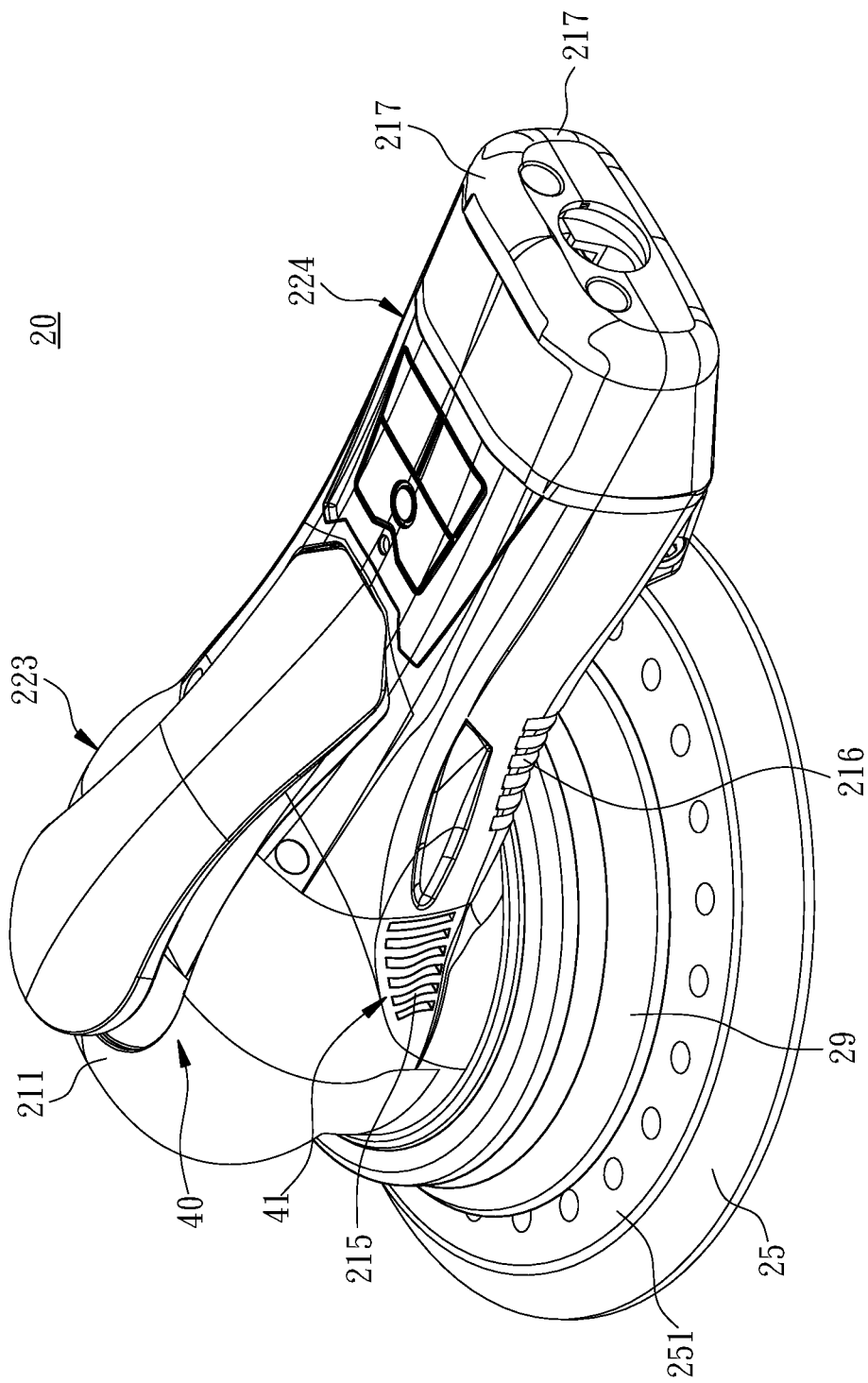
FIG. 4 is a perspective structural view of an embodiment of an electric tool grinding machine of the invention.

Please refer to FIG. 4, FIG. 5 and FIG. 7. In one embodiment, the electric tool grinding machine 20 comprises a circuit board 27. The circuit board 27 is disposed in the casing 21 and electrically connected to the electric motor 23. The casing 21 is divided into a hold portion 223 installed with the electric motor 23, and a grip portion 224 installed with the circuit board 27 and extending from the hold portion 223. The at least one first air inlet 215 is located on the hold portion 223, and the at least one second air inlet 216 is located on the grip portion 224 and faces the circuit board 27. Further, the hold portion 223 comprises a head section 225 and a neck section 226. The neck section 226 extends from the head section 225 and is close to the airflow generating member 24. Wherein the head section 225 mainly faces the palm of the user when the user grasps, and the neck section 226 provides the fingers to grip when the user grasps with the palm. In addition, the at least one first air inlet 215 is close to a position where the neck section 226 is connected to the grip portion 224.

Please refer to FIG. 5, in one embodiment, the plurality of shells 217 collectively form the hollow shell 211, and one of the plurality of shells 217 forms part of the hollow shell 211, the motor housing 212, the two partitioning plates 213, the at least one air outlet 214, the at least one first air inlet 215, and the at least one second air inlet 216.

Please refer to FIG. 6, a plurality of first air inlets 215 are implemented in the invention, and the plurality of first air inlets 215 are symmetrically arranged on the left and right sides of the casing 21 as defined by a central axis 228 of the casing 21.

Figure 9:
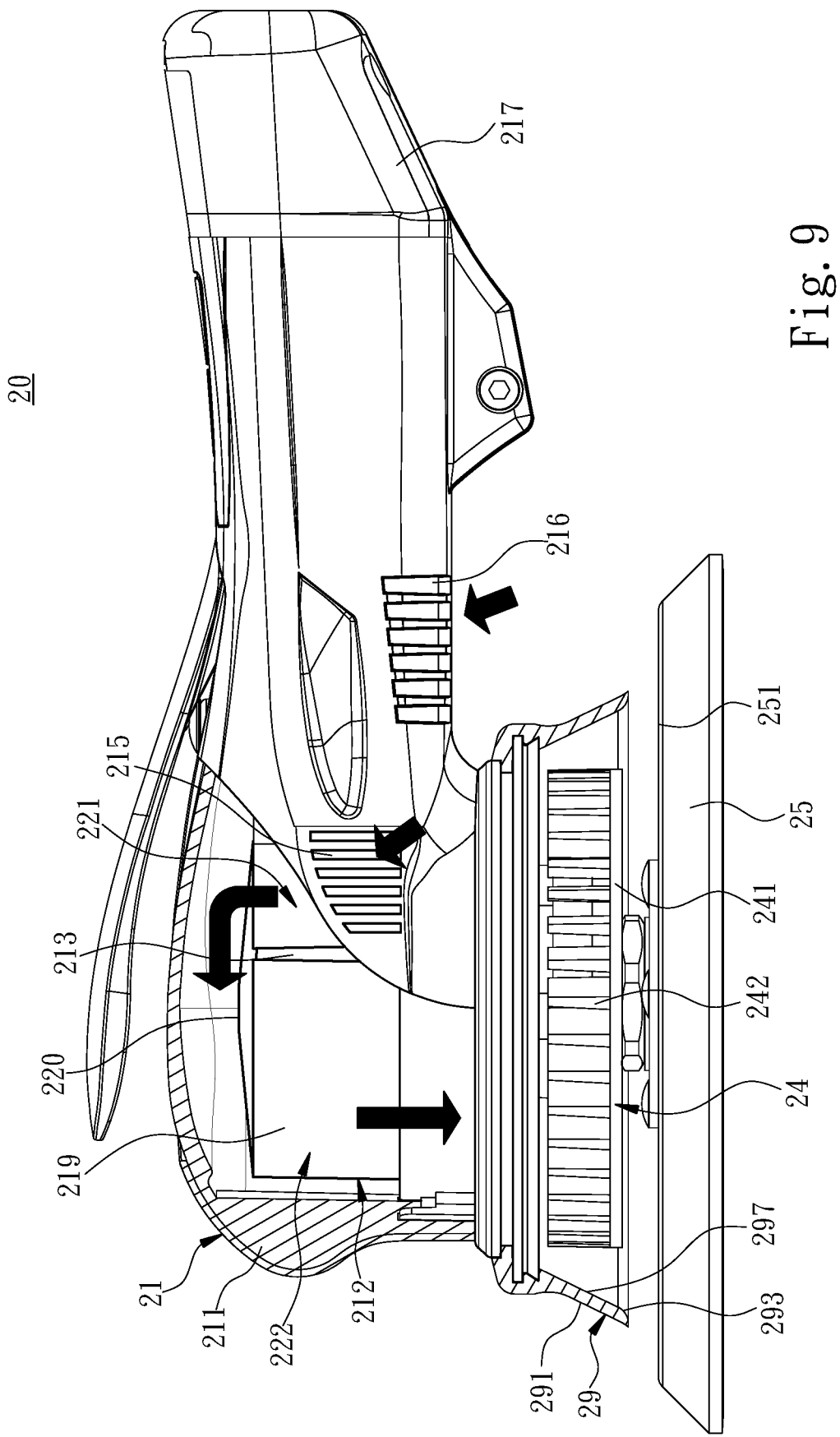
FIG. 9 is a first schematic diagram of airflow of an embodiment of the electric tool grinding machine of the invention.

Please refer to FIG. 9, in one embodiment, an air inlet position of the at least one second air inlet 216 is lower than an air inlet position of the at least one first air inlet 215.

Please refer to FIG. 6, in one embodiment, inside the hollow shell 211 is provided with two auxiliary partitioning plates 229 which cooperate with the two partitioning plates 213.

Please refer to FIG. 5, the electric tool grinding machine 20 of the invention comprises an eccentric block 28 and a grinding disc cover 29. The eccentric block 28 is connected to the electric motor 23. The eccentric block 28 is in a step shape and includes a first part 281 and a second part 282 connected below the first part 281. An axis of the second part 282 offsets from an axis of the first part 281. In addition, the airflow generating member 24 is attached on the eccentric block 28 and located in a space defined by the grinding disc cover 29. Further, the airflow generating member 24 is attached on the second part 282 of the eccentric block 28. A bottom edge of the airflow generating member 24 is on a same level as or slightly higher than a bottom edge of the second part 282 of the eccentric block 28. In addition, the airflow generating member 24 comprises a baseplate 241 and fan blades 242 disposed on the baseplate 241. The fan blades 242 are of a same shape, the fan blades 242 are only disposed on a side surface of the baseplate 241 facing the eccentric block 28, and the fan blades 242 are disposed at intervals and arranged in a circle on the baseplate 241. In one embodiment, in order to smoothly introduce a large amount of air into the casing 21, the airflow generating member 24 of the invention is disposed in the space defined by the grinding disc cover 29 based on the following conditions: a distance defined (as indicated by 42 in FIG. 10) between a top edge of each of the fan blades 242 and the casing 21 is greater than 50% of a longitudinal length of each of the fan blades 242, a distance defined (as indicated by 43 in FIG. 10) between an outer edge of each of the fan blades 242 and the grinding disc cover 29 is greater than 50% of a radial width of each of the fan blades 242, and an outer radius of the airflow generating member 24 is greater than a distance from the at least one air outlet 214 to a center of the motor housing 212. Based on the aforementioned conditions, in this embodiment, the airflow generating member 24 is not in close contact with the casing 21 and the grinding disc cover 29, but is capable of generating an airflow temporary storage area 30, and the airflow temporary storage area 30 is capable of keeping a wind guiding effect of the airflow generating member 24 smooth.

Figure 10:
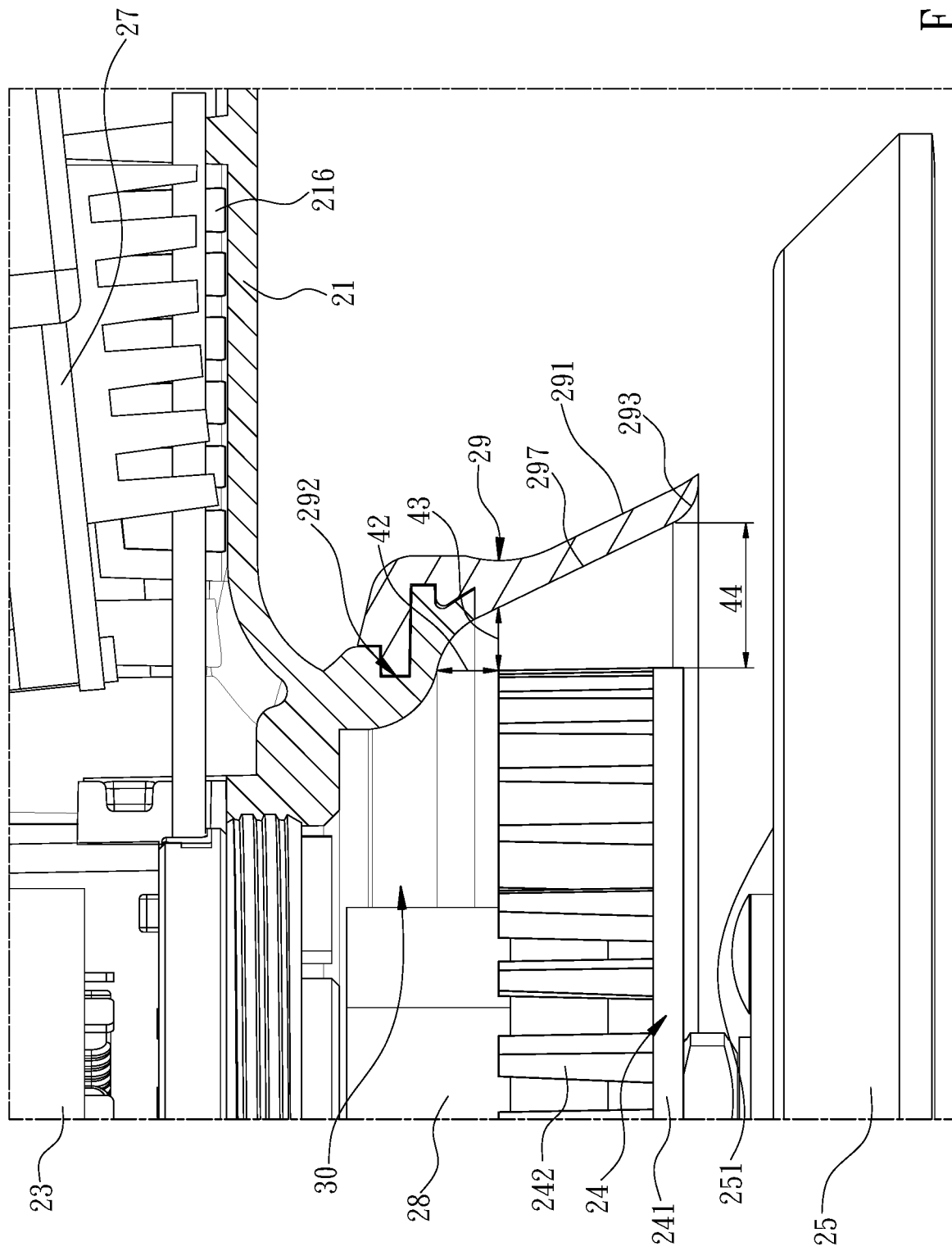
FIG. 10 is a first enlarged view of partial structures of an embodiment of the electric tool grinding machine of the invention.
Figure 11:
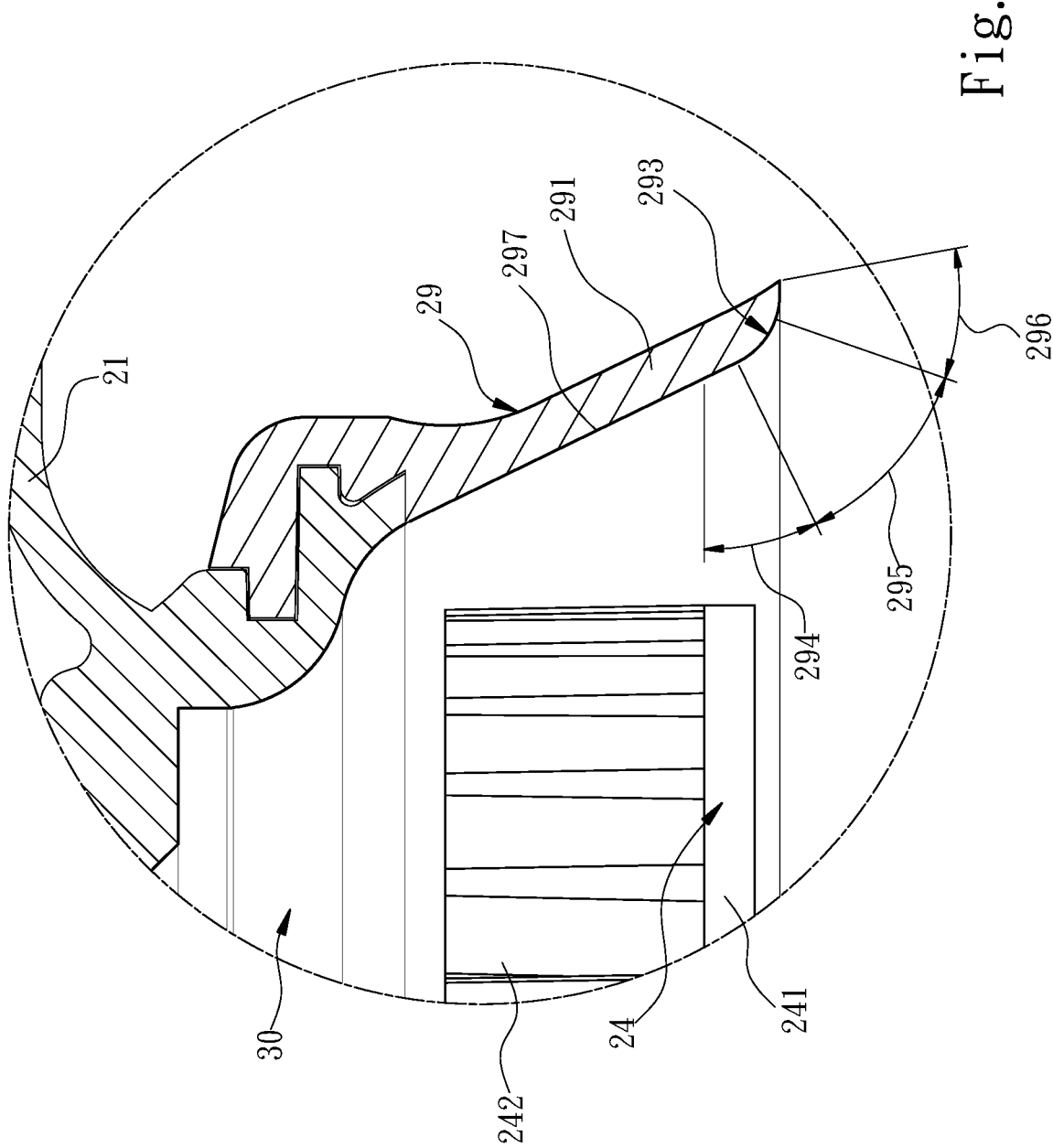
FIG. 11 is a second enlarged view of partial structures of an embodiment of the electric tool grinding machine of the invention.
Figure 12:
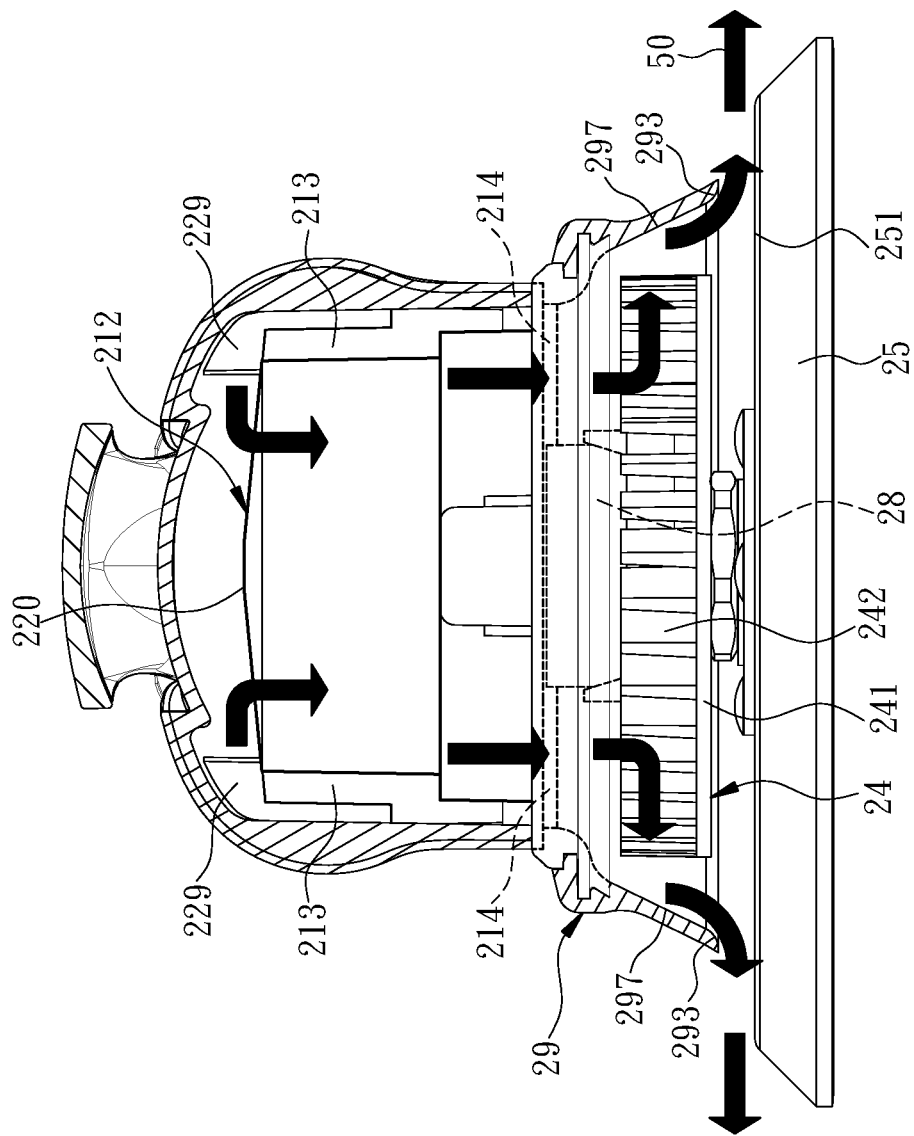
FIG. 12 is a second schematic diagram of airflow of the embodiment of the electric tool grinding machine of the invention.

Please refer to FIGS. 10, 11, and 12, the grinding disc cover 29 is assembled with the casing 21, and the airflow generating member 24 is covered in the grinding disc cover 29. The grinding disc cover 29 comprises a cover body 291, an assembly port 292 formed at one end of the cover body 291, and a release port 293 formed at an other end of the cover body 291. The grinding disc cover 29 does not have a vent hole other than the assembly port 292 and the release port 293. The assembly port 292 is coaxially disposed with the release port 293, that is, the assembly port 292 and the release port 293 are disposed correspondingly to each other. Accordingly, in the invention, through a guiding structure on the release port 293, an airflow is not discharged directly toward the grinding disc 25, so as to prevent the airflow discharging through a gap between the grinding disc cover 29 and the grinding disc 25 from erroneously impacting a surface of the grinding disc 25 and generating turbulence, which affects an overall efficiency of the airflow. Please refer to FIG. 11, in one embodiment, when the release port 293 is viewed from a direction of the assembly port 292 toward the release port 293, an inner wall of the release port 293 sequentially includes a flow guiding section 294, an arcuate diversion section 295, and an air outlet section 296. The flow guiding section 294 is connected with an inner wall surface of the cover body 291 close to the release port 293 without discontinuity and without difference in level. The flow guiding section 294 forms a flat surface together with the inner wall surface of the cover body 291 close to the release port 293. The arcuate diversion section 295 serves as a connection between the flow guiding section 294 and the air outlet section 296. The air outlet section 296 and the flow guiding section 294 have different slopes. Further, an included angle between the air outlet section 296 and the flow guiding section 294 is greater than 90 degrees. Furthermore, the air outlet section 296 can be parallel to a surface 251 of the grinding disc 25 facing the grinding disc cover 29. When the airflow (as indicated by 50 in FIG. 12) passes through the release port 293, a wall surface of the release port 293 (i.e., the flow guiding section 294, the arcuate diversion section 295, and the air outlet section 296) will produce an attached effect (also known as the Coandă effect), the airflow is affected by the arcuate diversion section 295 to change a flow direction, and is finally discharged along the air outlet section 296. Accordingly, in the invention, through a guiding structure on the release port 293, the airflow is not discharged directly toward the grinding disc 25, so as to prevent the airflow from directly impacting the grinding disc 25 and generating turbulence, which affects an overall efficiency of the airflow.

Please refer to FIG. 10 and FIG. 11, in one embodiment, a horizontal level of the release port 293 is equal to or lower than a horizontal level of the baseplate 241 of the airflow generating member 24 in the grinding disc cover 29. In addition, a diameter of the release port 293 is greater than a diameter of the assembly port 292. The grinding disc cover 29 is trumpet-shaped. A flow velocity of the airflow entering the grinding disc cover 29 from the at least one air outlet 214 is slowed down in order to prevent a flow velocity of the airflow from being too fast to generate turbulence in the grinding disc cover 29. In one embodiment, a distance (as indicated by 44 in FIG. 10) between the release port 293 and each of the plurality of fan blades 242 is greater than a radial length of each of the plurality of fan blades 242. In addition, the cover body 291 includes an inclined surface 297 between the assembly port 292 and the release port 293, the inclined surface 297 is connected with the flow guiding section 294 of the release port 293, and a slope of the flow guiding section 294 is same as a slope of the inclined surface 297. On the other hand, in one embodiment, a distance (as indicated by 45 in FIG. 6) from an outer edge of the at least one air outlet 214 to the center of the motor housing 212 is smaller than the outer radius of the airflow generating member 24.

What is claimed is:

1. An electric tool grinding machine, comprising:
an electric motor;
an airflow generating member, rotating when the electric motor being activated; and
a casing, comprising a hollow shell, a motor housing located in the hollow shell and provided for disposing the electric motor, two partitioning plates located between a side wall of the motor housing and the hollow shell, at least one air outlet facing the airflow generating member, at least one first air inlet formed on the hollow shell, and at least one second air inlet formed on the hollow shell and spaced apart from the first air inlet, wherein the two partitioning plates define a connecting line therebetween, and the connecting line divides the motor housing into an air inlet portion and an air outlet portion communicating with the air inlet portion, the at least one air outlet is disposed between the air outlet portion and the hollow shell, the at least one first air inlet faces the air inlet portion of the motor housing, when the airflow generating member is activated, a pressure difference is generated by the intake air of the at least one first air inlet between the hollow shell and the air inlet portion of the motor housing, and air is drawn into the second air inlet.

2. The electric tool grinding machine as claimed in claim 1, wherein the motor housing comprises a top surface connected to the side wall, the two partitioning plates are connected to the side wall, and an airflow passes through the top surface.

3. The electric tool grinding machine as claimed in claim 1, wherein inside the hollow shell is provided with two auxiliary partitioning plates which cooperate with the two partitioning plates.

4. The electric tool grinding machine as claimed in claim 1, wherein the electric tool grinding machine comprises a circuit board provided in the casing and electrically connected to the electric motor, the casing has a hold portion provided with the electric motor, and a grip portion provided with the circuit board and extending from the hold portion, and wherein the at least one first air inlet is located on the hold portion, and the at least one second air inlet is located on the grip portion and faces the circuit board.

5. The electric tool grinding machine as claimed in claim 4, wherein the hold portion comprises a head section and a neck section extending from the head section and located between the airflow generating member and the head section, and the at least one first air inlet is disposed at a position where the neck section is connected to the grip portion.

6. The electric tool grinding machine as claimed in claim 4, wherein an air inlet position of the at least one second air inlet is lower than an air inlet position of the at least one first air inlet.

7. The electric tool grinding machine as claimed in claim 1, wherein the casing is composed of a plurality of shells, and one of the plurality of shells forms the motor housing, the two partitioning plates, the at least one air outlet, the at least one first air inlet and the at least one second air inlet.

8. The electric tool grinding machine as claimed in claim 1, wherein the at least one air outlet is disposed along an edge of the motor housing.

9. A casing of an electric tool grinding machine, comprising:
a hollow shell;
a motor housing, located in the hollow shell;
two partitioning plates, located between a side wall of the motor housing and the hollow shell, the two partitioning plates located on two opposite sides of the motor housing;
at least one air outlet, formed on the hollow shell or an outer edge of the motor housing;
at least one first air inlet, formed on the hollow shell, the at least one first air inlet and the at least one air outlet respectively located on two sides of one of the two partitioning plates, the at least one first air inlet facing the motor housing and adjacent to one of the two partitioning plates; and at least one second air inlet, formed on the hollow shell and located on one side of one of the two partitioning plates where the first air inlet is located, and wherein a distance between the second air inlet and the air outlet is greater than a distance between the first air inlet and the air outlet.

10. The casing of the electric tool grinding machine as claimed in claim 9, wherein inside the hollow shell is provided with two auxiliary partitioning plates which cooperate with the two partitioning plates.

11. The casing of the electric tool grinding machine as claimed in claim 10, wherein the hollow shell is divided into a hold portion and a grip portion extending from the hold portion, the first air inlet is located at the hold portion, and the second air inlet is located at the grip portion.

12. The casing of the electric tool grinding machine as claimed in claim 11, wherein the hold portion comprises a head section and a neck section extending from the head section, and the at least one first air inlet is disposed at a position where the neck section is connected to the grip portion.

13. The casing of the electric tool grinding machine as claimed in claim 12, wherein an air inlet position of the at least one second air inlet is lower than an air inlet position of the at least one first air inlet.

14. The casing of the electric tool grinding machine as claimed in claim 9, wherein a plurality of shells collectively form the hollow shell, and one of the plurality of shells forms part of the hollow shell, the motor housing, the two partitioning plates, the at least one air outlet, the at least one first air inlet and the at least one second air inlet.

15. The casing of the electric tool grinding machine as claimed in claim 9, wherein the air outlet is disposed along an edge of the motor housing.

* * * * *